US008510785B2

(12) United States Patent
McKinley et al.

(10) Patent No.: US 8,510,785 B2
(45) Date of Patent: Aug. 13, 2013

(54) ADAPTIVE MEDIA CACHING FOR VIDEO ON DEMAND

(75) Inventors: Brittain S. McKinley, Groton, MA (US); So C. Chen, Westford, MA (US); Brian J. Tarbox, Littleton, MA (US)

(73) Assignee: Motorola Mobility LLC, Libertyville, IL (US)

( * ) Notice: Subject to any disclaimer, the term of this patent is extended or adjusted under 35 U.S.C. 154(b) by 820 days.

(21) Appl. No.: 12/581,447

(22) Filed: Oct. 19, 2009

(65) Prior Publication Data

US 2011/0093905 A1 Apr. 21, 2011

(51) Int. Cl.
*H04N 7/173* (2011.01)

(52) U.S. Cl.
USPC ............ 725/115; 725/116; 386/294; 386/295

(58) Field of Classification Search
None
See application file for complete search history.

(56) References Cited

U.S. PATENT DOCUMENTS 5,351,075 A * 9/1994 Herz et al. ...................... 725/13
5,586,264 A 12/1996 Belknap et al.
5,790,176 A * 8/1998 Craig ............................ 725/115
5,801,747 A * 9/1998 Bedard ........................... 725/46
5,815,662 A 9/1998 Ong
6,115,740 A * 9/2000 Mizutani ....................... 709/217
6,542,967 B1 4/2003 Major
7,324,555 B1 1/2008 Chen et al.
7,533,239 B2 5/2009 Gill et al.
2002/0156980 A1 10/2002 Rodriguez
2003/0005457 A1* 1/2003 Faibish et al. ................... 725/94
2003/0121049 A1* 6/2003 Yurt et al. ....................... 725/93
2004/0158863 A1* 8/2004 McLain .......................... 725/73
2005/0267948 A1 12/2005 McKinley et al.
2006/0230170 A1 10/2006 Chintala et al.
2009/0198897 A1* 8/2009 Arimilli et al. ............... 711/122
2012/0159558 A1* 6/2012 Whyte et al. .................... 725/95

OTHER PUBLICATIONS

PCT Search Report & Written Opinion, RE: Application #PCT/US2010/049764; Dec. 29, 2010.

* cited by examiner

*Primary Examiner* — Brian Pendleton
*Assistant Examiner* — Fernando Alcon

(57) ABSTRACT

A method and on-demand computing system for hierarchical caching of content in an on-demand computing device. The method receives, at the on-demand computing device, a request to send media content to a playback device, where the media content is stored in a media library of a content server. The method retrieves the media content from a hierarchical cache for the on-demand computing device, and sends the media content to the playback device. The hierarchical cache includes a first cache, a second cache, and the content library, where the first cache has a length based on an age of the second cache.

21 Claims, 4 Drawing Sheets

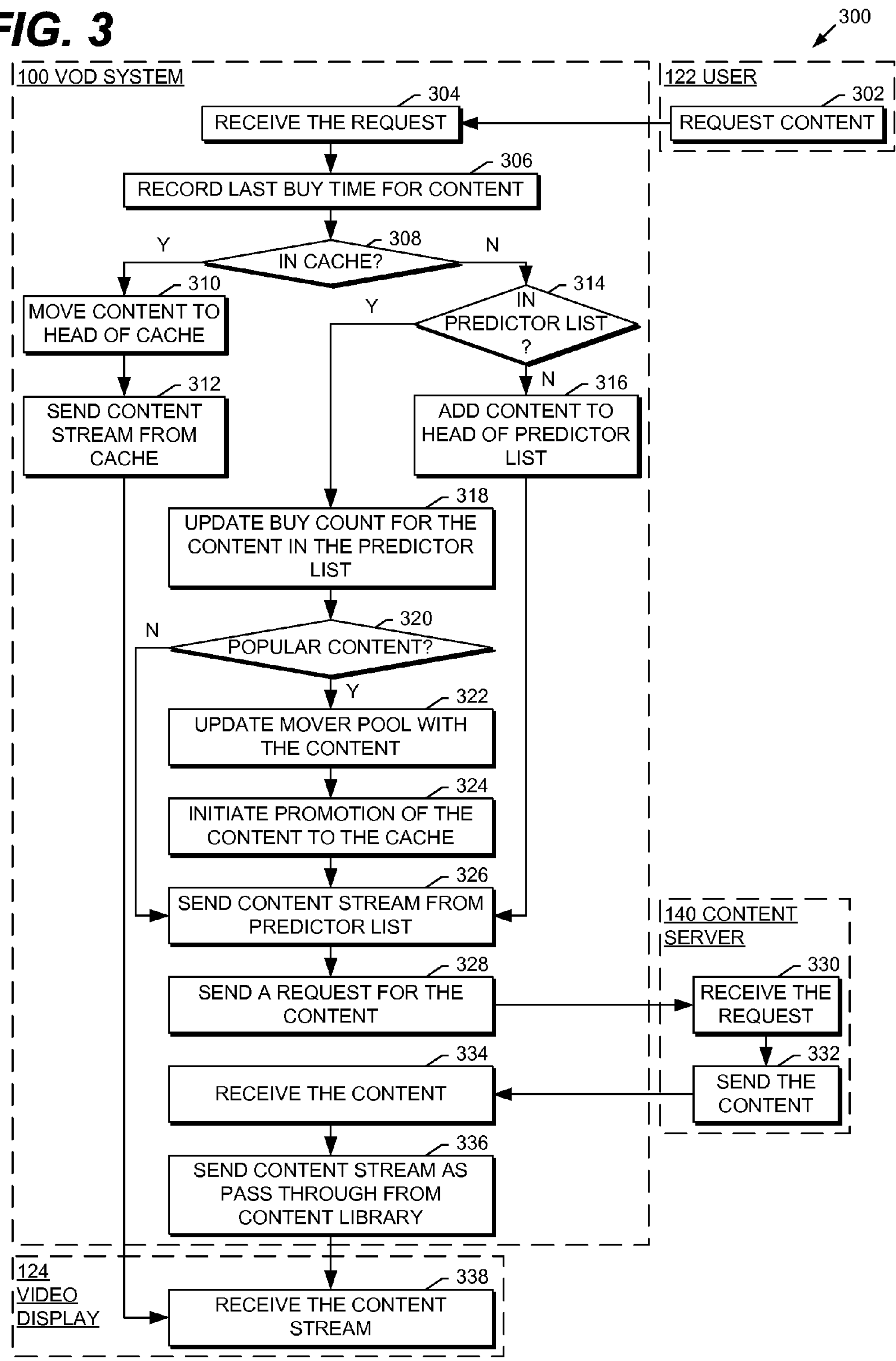
FIG. 3
300
100 VOD SYSTEM
122 USER
302
REQUEST CONTENT
304
RECEIVE THE REQUEST
306
RECORD LAST BUY TIME FOR CONTENT
308
IN CACHE?
Y
N
310
MOVE CONTENT TO HEAD OF CACHE
314
IN PREDICTOR LIST ?
Y
N
312
SEND CONTENT STREAM FROM CACHE
316
ADD CONTENT TO HEAD OF PREDICTOR LIST
318
UPDATE BUY COUNT FOR THE CONTENT IN THE PREDICTOR LIST
320
POPULAR CONTENT?
N
Y
322
UPDATE MOVER POOL WITH THE CONTENT
324
INITIATE PROMOTION OF THE CONTENT TO THE CACHE
326
SEND CONTENT STREAM FROM PREDICTOR LIST
140 CONTENT SERVER
328
SEND A REQUEST FOR THE CONTENT
330
RECEIVE THE REQUEST
332
SEND THE CONTENT
334
RECEIVE THE CONTENT
336
SEND CONTENT STREAM AS PASS THROUGH FROM CONTENT LIBRARY
124 VIDEO DISPLAY
338
RECEIVE THE CONTENT STREAM

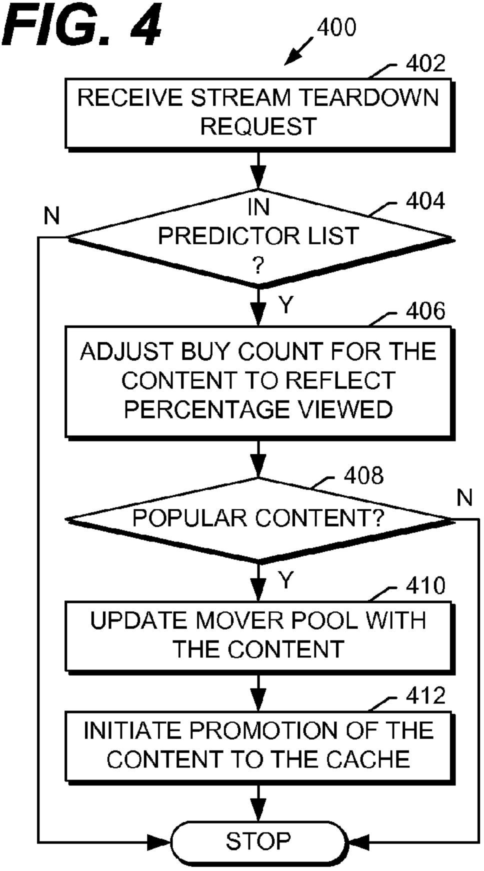
FIG. 4
400
402
RECEIVE STREAM TEARDOWN REQUEST
404
IN PREDICTOR LIST ?
N
Y
406
ADJUST BUY COUNT FOR THE CONTENT TO REFLECT PERCENTAGE VIEWED
408
POPULAR CONTENT?
N
Y
410
UPDATE MOVER POOL WITH THE CONTENT
412
INITIATE PROMOTION OF THE CONTENT TO THE CACHE
STOP

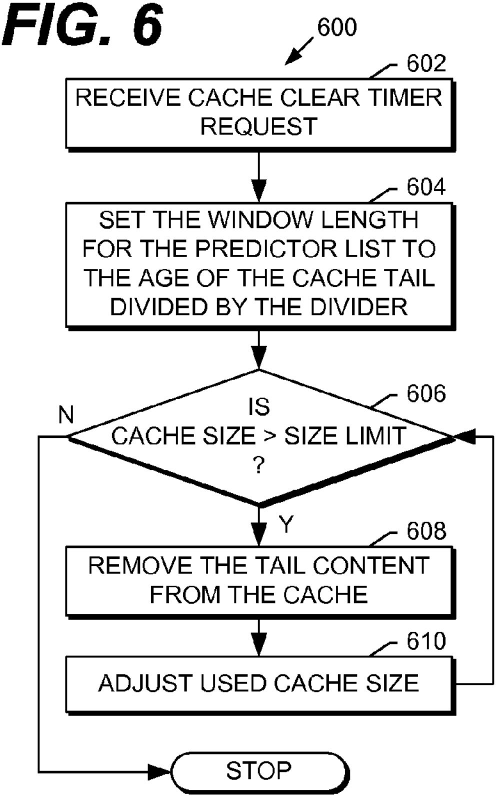
FIG. 6
600
602
RECEIVE CACHE CLEAR TIMER REQUEST
604
SET THE WINDOW LENGTH FOR THE PREDICTOR LIST TO THE AGE OF THE CACHE TAIL DIVIDED BY THE DIVIDER
606
IS CACHE SIZE > SIZE LIMIT ?
N
Y
608
REMOVE THE TAIL CONTENT FROM THE CACHE
610
ADJUST USED CACHE SIZE
STOP

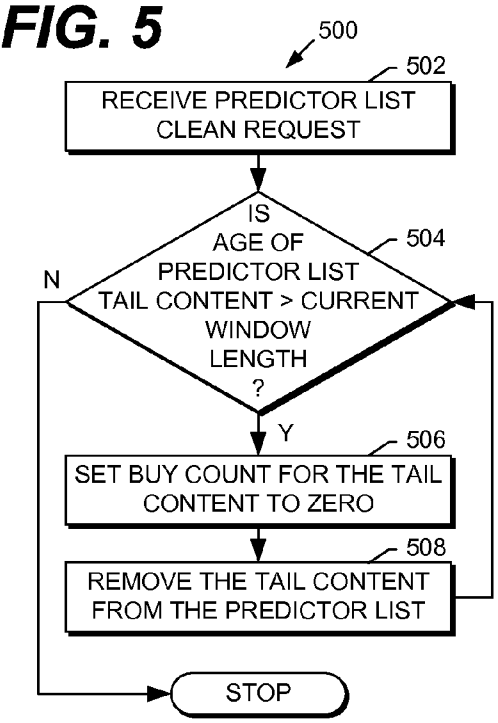
FIG. 5
500
502
RECEIVE PREDICTOR LIST CLEAN REQUEST
504
IS AGE OF PREDICTOR LIST TAIL CONTENT > CURRENT WINDOW LENGTH ?
N
Y
506
SET BUY COUNT FOR THE TAIL CONTENT TO ZERO
508
REMOVE THE TAIL CONTENT FROM THE PREDICTOR LIST
STOP

ADAPTIVE MEDIA CACHING FOR VIDEO ON DEMAND

BACKGROUND

A Video-on-Demand (VOD) system delivers video content to a user as a video data stream whenever the user selects to view the video content. An Audio-Video-on-Demand (AVOD) system is a VOD system that also delivers audio content to a user as an audio data stream whenever the user selects to listen to the audio content. Since commercial VOD systems typically process video content and audio content (i.e., media content), the term VOD system implies both a VOD and AVOD system.

The VOD system delivers the video data stream to either a set-top box that allows the user to view the video content in real time, or a device such as a computer, digital video recorder (DVR), personal video recorder, or portable media player that allows the user to view the video content in the future. Cable, satellite, and telecommunications television providers typically offer VOD streaming, such as pay-per-view, whereby a user buys or selects a movie or television program and it begins to play on the television set almost instantaneously, and downloading to a DVR rented from the provider, for viewing in the future.

Caching allows a computer system to store a copy of data that it frequently accesses in a temporary storage area that is rapidly accessible, thus alleviating the time and expense to continually retrieve the data from the original location. Due to the increasing size of audio and video media libraries, the VOD system employs hierarchical caching (i.e., caching at multiple levels of the storage hierarchy) to balance storage and retrieval efficiency against bandwidth performance.

Hierarchical caching in the VOD system may utilize a variety of storage device types in combination with a variety of network topologies. These storage device types include Dynamic Random Access Memory (DRAM), Serial ATA (SATA) mass storage devices such as a hard disk drive or optical drive, Small Computer System Interface (SCSI) disks, and non-volatile computer memory such as flash memory. Given a particular usage pattern of the users, the VOD system may store different types of video content streams on different types of storage devices. The VOD system may stream video content that has the highest popularity from either DRAM or flash memory, and video content that has the lowest popularity from disks on a central network resource if the necessary bandwidth is available. The difficulty lies in correctly determining which type of the video content to store at each caching layer, and appropriately determining the size of those layers in light of the size of the library and utilization patterns for the users. A further difficulty lies in the VOD system that employs flash memory in a hierarchical caching architecture because the number of memory writes performed has an impact on the useful life of the flash memory. If it performs too many writes, the flash memory will suffer burnout. Thus, hierarchical caching in the VOD system that utilizes flash memory must take the burnout factor into account and attempt to maximize the performance gain of using flash memory, while minimizing the writes performed. Since the popularity of video content is linked to the usage pattern of the users, the determination of the popularity of the video content must be automated for the VOD system and cannot be set by an outside method because the usage pattern of each user can vary, and each user can change their usage pattern quickly, thereby changing the popularity of the video content. Therefore, a hierarchical caching algorithm for the VOD system must determine the popularity of the video content dynamically and use feedback to adjust the popularity to maximize efficiency and bandwidth for the content delivery.

SUMMARY

Aspects of the present invention provide a method and on-demand computing system for hierarchical caching of content in an on-demand computing device. The method receives, at the on-demand computing device, a request to send media content to a playback device, where the media content is stored in a media library of a content server. The method retrieves the media content from a hierarchical cache for the on-demand computing device, and sends the media content to the playback device. The hierarchical cache includes a first cache, a second cache, and the content library, where the first cache has a length based on an age of the second cache.

BRIEF DESCRIPTION OF THE DRAWINGS

FIGS. 3, 4, 5, and 6 are flow diagrams that illustrate a method for hierarchical caching of content in an on-demand computing device according to an embodiment of the present invention.

DETAILED DESCRIPTION

Figure 1:
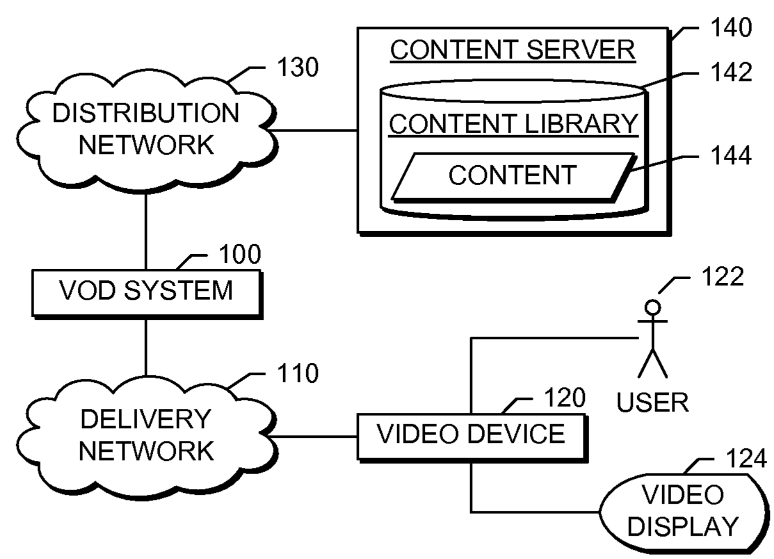
FIG. 1 is network diagram that illustrates one embodiment of the hardware components of a system that performs the present invention.

FIG. 1 is network diagram that illustrates one embodiment of the hardware components of a system that performs the present invention. FIG. 1 shows a Video-on-Demand (VOD) system 100 that communicates with a delivery network 110 and a distribution network 130. The delivery network 110 connects a video device 120, user 122, and video display 124 to the VOD system 100. In one embodiment, the video device 120 is a set-top box, or a device such as a digital video recorder (DVR). One skilled in the art will appreciate that the delivery network 110 can connect a plurality of video devices 120 to the VOD system 100. The distribution network 130 connects a content server 140, content library 142, and content 144 to the VOD system 100. In one embodiment, the content server 140 is a general-purpose server computer that supplies the content 144 stored in the content library 142 to the VOD system 100. One skilled in the art will appreciate that the distribution network 130 can connect a plurality of content servers 140 to the VOD system 100.

The delivery network 110 and the distribution network 130 shown in FIG. 1, in one embodiment, are public communication networks that connect the VOD system 100 to the video device 120 and the content server 140. The present invention also contemplates the use of comparable network architectures. Comparable network architectures include the Public Switched Telephone Network (PSTN), a public packet-switched network carrying data and voice packets, a wireless network, and a private network. A wireless network includes a cellular network (e.g., a Time Division Multiple Access (TDMA), Code Division Multiple Access (CDMA), or Orthogonal Frequency Division Multiplexing (OFDM) network), a satellite network, and a wireless Local Area Network (LAN) (e.g., a wireless fidelity (Wi-Fi) network). A private network includes a LAN, a Personal Area Network (PAN) such as a Bluetooth network, a wireless LAN, a Virtual Private Network (VPN), an intranet, or an extranet. An intranet is a private communication network that provides an organization such as a corporation, with a secure means for trusted members of the organization to access the resources on the organization's network. In contrast, an extranet is a private communication network that provides an organization, such as a corporation, with a secure means for the organization to authorize non-members of the organization to access certain resources on the organization's network. The system also contemplates network architectures and protocols such as Ethernet, Token Ring, Systems Network Architecture, Internet Protocol, Transmission Control Protocol, User Datagram Protocol, Asynchronous Transfer Mode, and proprietary network protocols comparable to the Internet Protocol.

Figure 2:
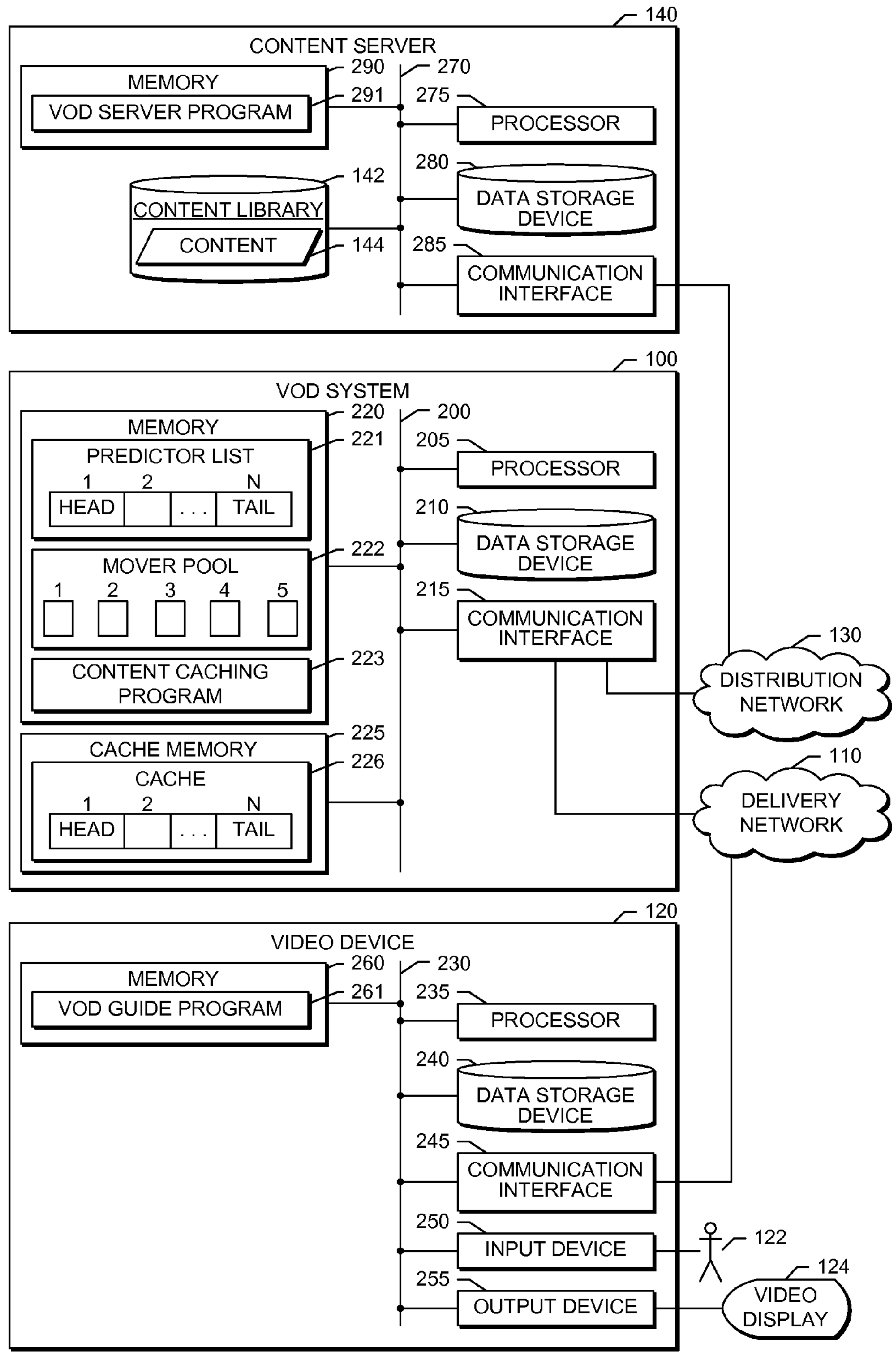
FIG. 2 is a block diagram that illustrates, in detail, one embodiment of the hardware components shown in FIG. 1.

FIG. 2 is a block diagram that illustrates, in detail, one embodiment of the hardware components shown in FIG. 1. In particular, FIG. 2 illustrates the hardware components and software comprising the VOD system 100, video device 120, and content server 140.

The VOD system 100 shown in FIG. 2, in one embodiment, is a general-purpose computing device that performs the present invention. A bus 200 is a communication medium that connects a processor 205, data storage device 210 (such as a Serial ATA (SATA) hard disk drive, optical drive, Small Computer System Interface (SCSI) disk, or the like), communication interface 215, memory 220 (such as Random Access Memory (RAM), Dynamic RAM (DRAM), or the like), and cache memory 240 (such as a data storage device, non-volatile computer memory, flash drive, or the like). The communication interface 215 transmits and receives data between the VOD system 100 and the video device 120 via the delivery network 110, and between the VOD system 100 and the content server 140 via the distribution network 130.

The processor 205 performs the disclosed methods by executing the sequences of operational instructions that comprise each computer program resident in, or operative on, the memory 220. The reader should understand that the memory 220 may include operating system, administrative, and database programs that support the programs disclosed in this application. In one embodiment, the configuration of the memory 220 of the VOD system 100 includes a predictor list 221, mover pool 222, and content caching program 223. In one embodiment, the configuration of the cache memory 225 of the VOD system 100 includes a cache 226. In another embodiment, not shown in FIG. 2, the data storage device 210 of the VOD system 100 includes the cache 226. The content caching program 223 performs the method of the present invention disclosed in detail in FIGS. 3, 4, 5, and 6. When the processor 205 performs the disclosed methods, it stores intermediate results in the memory 220 or data storage device 210. In another embodiment, the memory 220 may swap these programs, or portions thereof, in and out of the memory 220 as needed, and thus may include fewer than all of these programs at any one time.

In one embodiment the predictor list 221 is a least recently used (LRU) cache having a number, N, of items that include a head item, and a tail item. The number of items in the predictor list 221 is configurable and changes over time based on the current predictor age setting. When a user 122 purchases content 144 that is not already in the predictor list 221, a buy count for the content 144 is set to an initial value. Over time, the content 144 in the predictor list 221 is aged out if a user 122 does not purchase it again within a defined time window of time. Thus, when a user 122 only purchases content 144 once, it will eventually be removed from the predictor list 221 and the buy count set back to zero until the next purchase. The length of the defined time window is adapted based on the usage pattern of the cache 226. If the user 122 purchases the content 144 again, then it is moved to the head of the predictor list 221 in a LRU fashion. When a user 122 stops a stream, the buy count is adjusted to only represent the percentage of the content 144 that the user 122 viewed. For example, if an hour-long content was only viewed for 45 minutes then the buy count would be adjusted to 0.75. Initially, each viewing of the content 144 is worth an initial buy count until the stream is stopped and then it is adjusted based on the actual viewing time. The initial buy count is configurable. In one embodiment, the initial buy count is 0.5.

In one embodiment, the mover pool 222 includes a number, N, of elements for storing content 144 waiting to be promoted to the cache 226. The number of elements in the mover pool 222 is configurable to smooth out any network bursting. As shown in FIG. 2, the mover pool 222 includes five (5) elements. When the VOD system 100 examines the buy count for content 144, and determines that the buy count exceeds a threshold, T, then the content 144 is deemed to be popular enough to be moved into the cache 226, and the VOD system 100 moves the content 144 to one of the mover pool 222 elements, if one is available, to initiate the promotion of the content 144 to the cache 226. In one embodiment, the VOD system 100 moves the content in the mover pool 222 elements in parallel.

In one embodiment the cache 226 is a least recently used (LRU) cache having a number, N, of items that include a head item, and a tail item. The number of items in the cache 226 changes over time based on the size of the content in the cache 226 and the configurable cache size limit. When a user 122 purchases content 144, the VOD system 100 records the time of the purchase and moves the content 144 to the head of the cache 226. Therefore, the content with the oldest purchase time will be at the tail of the cache 226. The age of the oldest content in the cache 226 sets the time to use for the predictor list 221 using a divider. For example, if the VOD system is using a value of 8 as the divider, and the oldest content in the cache was purchased 8 hours ago, then the predictor length would be set to 1 hour. As the age of the oldest content gets shorter, the predictor window also gets shorter, thus having the effect of narrowing the time required for content to become popular enough to promote. During low usage times the window will widen allowing content to become popular if it is purchased multiple times within the "age divided by divider" hours, but as the usage goes up, and the window narrows, it would take the same number of purchases in a shorter time to reach the same popularity. This feedback helps to smooth out promoting the content to the cache 226 so that the promotions happen at a constant rate and aren't all occurring during the usage peaks.

The video device 120 shown in FIG. 2, in one embodiment, is a general-purpose computing device that performs the present invention. A bus 230 is a communication medium that connects a processor 235, data storage device 240 (such as a Serial ATA (SATA) hard disk drive, optical drive, Small Computer System Interface (SCSI) disk, or the like), communication interface 245, input device 250 (such as a keyboard, keypad, touchscreen, television remote control, mobile telephone, or the like), output device 255 (such as a monitor, graphic display, television screen, media content playback device, or the like), and memory 260 (such as Random Access Memory (RAM), Dynamic RAM (DRAM), or the like). The communication interface 245 transmits and receives data between the video device 120 and the VOD system 100 via the delivery network 110.

The processor 235 performs the disclosed methods by executing the sequences of operational instructions that comprise each computer program resident in, or operative on, the memory 260. The reader should understand that the memory 260 may include operating system, administrative, and database programs that support the programs disclosed in this application. In one embodiment, the configuration of the memory 260 of the video device 120 includes a VOD guide program 261. The VOD guide program 261 communicates with the content caching program 223 on the VOD system 100 to perform the method of the present invention disclosed in detail in FIG. 3. The VOD guide program 261 allows the user 122 to select and request the content 144 and displays the content 144 on the video display 124. When the processor 235 performs the disclosed methods, it stores intermediate results in the memory 260 or data storage device 240. In another embodiment, the memory 260 may swap these programs, or portions thereof, in and out of the memory 260 as needed, and thus may include fewer than all of these programs at any one time.

The content server 140 shown in FIG. 2, in one embodiment, is a general-purpose computing device that performs the present invention. A bus 270 is a communication medium that connects a processor 275, data storage device 280 (such as a Serial ATA (SATA) hard disk drive, optical drive, Small Computer System Interface (SCSI) disk, or the like), communication interface 285, memory 290 (such as Random Access Memory (RAM), Dynamic RAM (DRAM), or the like), and content library 142. The communication interface 285 transmits and receives data between the content server 140 and the VOD system 100 via the distribution network 130.

The processor 275 performs the disclosed methods by executing the sequences of operational instructions that comprise each computer program resident in, or operative on, the memory 290. The reader should understand that the memory 290 may include operating system, administrative, and database programs that support the programs disclosed in this application. In one embodiment, the configuration of the memory 290 of the content server 140 includes a VOD server program 291. The VOD server program 291 communicates with the content caching program 223 on the VOD system 100 to perform the method of the present invention disclosed in detail in FIG. 3. The VOD server program 291 receives requests for the content 144 from the VOD system 100 and sends the content 144 to the VOD system 100 in response to those requests. When the processor 275 performs the disclosed methods, it stores intermediate results in the memory 290 or data storage device 280. In another embodiment, the memory 290 may swap these programs, or portions thereof, in and out of the memory 290 as needed, and thus may include fewer than all of these programs at any one time.

FIGS. 3, 4, 5, and 6 are flow diagrams that illustrate a method for hierarchical caching of content in an on-demand computing device according to an embodiment of the present invention. In particular, FIG. 3, with reference to FIG. 1 and FIG. 2, illustrates a user 122 operating a video device 120 to send a request to the VOD system 100 to stream content 144 on the video display 124.

The process 300 shown in FIG. 3 begins when a user 122 decides to view content 144 stored in a content library 142. The user 122 operates an input device to send a request to a VOD system 100 (step 302). The request is to display the content 144 on the video display 124. The VOD system 100 receives the request (step 304), records the last buy time for the content 144 (step 306), and determines whether the content 144 is stored in the cache 226 (step 308). If the content 144 is stored in the cache 226 (step 308, Y branch), the VOD system 100 moves the content 144 to the head of the cache 226 (step 310), and sends the content 144 as a content stream to the video display 124 (step 312). The video display 124 receives the content stream (step 338) from the VOD system 100 and displays it for the user 122.

If the content 144 is not stored in the cache 226 (step 308, N branch), the VOD system 100 examines the predictor list 221 in the memory 220 to determine whether the content 144 is in the predictor list 221 (step 314). If the content 144 is in predictor list 221 (step 314, Y branch), the VOD system 100 updates the buy count for the entry in the predictor list 221 that corresponds to the content 144 (step 318). The VOD system 100 then examines the usage patterns for the content 144 to determine whether the content 144 is popular (step 320). If the content 144 is popular (step 320, Y branch), the VOD system updates the mover pool 222 with the content 144 (step 322), when a slot is available, to initiate promotion of the content 144 to the cache 226 (step 324). The VOD system 100 then sends the content 144 as a content stream to the video display 124 (step 326) by sending a request for the content 144 (step 328) to the content server 140. The content server 140 receives the request (step 330), retrieves the content 144 from the content library 142, and sends the content 144 to the VOD system 100 (step 332). The VOD system 100 receives the content 144 (step 334, and sends the content 144 as pass through from the content server 140 to the video display 124 (step 338). The video display 124 receives the content stream (step 338) from the VOD system 100 and displays it for the user 122.

If the content 144 is not in predictor list 221 (step 314, N branch), the VOD system 100 adds the content 144 to the head of the predictor list 221 updates the buy count for the entry in the predictor list 221 that corresponds to the content 144 (step 318). The VOD system 100 then sends the content 144 as a content stream to the video display 124 (step 326) by sending a request for the content 144 (step 328) to the content server 140. The content server 140 receives the request (step 330), retrieves the content 144 from the content library 142, and sends the content 144 to the VOD system 100 (step 332). The VOD system 100 receives the content 144 (step 334, and sends the content 144 as pass through from the content server 140 to the video display 124 (step 338). The video display 124 receives the content stream (step 338) from the VOD system 100 and displays it for the user 122.

In one embodiment of the process 300 shown in FIG. 3, the VOD system 100 predicatively caches content based on customer usage patterns in a way that minimizes the churn rate of the cache 226, implemented as flash memory, in order to reduce flash memory burnout. The process 300 uses a feedback loop to change the measurement interval of the popularity predictor in order to self-adjust to usage patterns and streams count.

The process 300 uses two LRU caches, the predictor list 221 and cache 226, where the length of the first cache (the predictor list 221) is adjusted by the oldest item in the second cache (the cache 226). When items are first purchased by the user 122 they are not moved into the cache 226 immediately, instead they are played from a higher level storage media until they are deemed to be popular enough to warrant promoting into the cache 226. This is done for a number of reasons, including that the item may be in the "long tail" of the usage curve, meaning that it is unlikely to be purchased again and this user will be the only one to watch it. If the content was moved immediately into the cache 226, it is likely that it would cause the eviction of a more popular item. This adversely affects not just the efficiency of the cache 226, but also the wear out time the cache 226, if it is flash memory. For long tail items, it is better to simply stream the media directly from the content server 140 and not cache it at all. Therefore, the content is put into the predictor list 221 to determine whether the content is popular enough to move it into the cache 226.

FIG. 4, with reference to FIG. 1 and FIG. 2, illustrates the stream teardown process for the VOD system 100. The stream teardown process 400 shown in FIG. 4 begins when the VOD system 100 receives a stream teardown request (step 402). In one embodiment, the stream teardown request is generated when a user 122 finishes viewing the content 144 that they requested. The VOD system 100 examines the predictor list 221 in the memory 220 to determine whether the content 144 is in the predictor list 221 (step 404). If the content 144 is in predictor list 221 (step 404, Y branch), the VOD system 100 adjusts the buy count for the content 144 to reflect the percentage of the content that the user 122 viewed. The VOD system 100 then examines the usage patterns for the content 144 to determine whether the content 144 is popular (step 408). If the content 144 is popular (step 408, Y branch), the VOD system 100 updates the mover pool 222 with the content 144 (step 410), when a slot is available, to initiate promotion of the content 144 to the cache 226 (step 412), then the process 400 stops. If the content 144 is not popular (step 408, N branch), the stream teardown process 400 stops. If the content 144 is not stored in the predictor list 221 (step 404, N branch), the stream teardown process 400 stops.

Once in the predictor list 221, the length of each purchase is recorded and summed For example, if content 144 is one (1) hour long, but the user 122 only watches it for 15 minutes, then it is summed as a 25% purchase. Popularity is measured by summing these partial buys together to come up with a "buy count" value. Since the percentage watched can only be determined when the stream on the content is complete, an initial buy value is assumed when the user 122 purchases the content 144, then adjusted on teardown. This initial buy value is configurable. In one embodiment, the initial buy value is set to 50%. Thus, two content streams that are both active on the content 144 at the same time would result in a 100% buy, 50% for the first content stream, and 50% for the second content stream. If the first stream ends after playing 75% of the content, the buy count would be adjusted to 0.75+0.50=1.25. If at any time the buy count crosses a settable threshold, the content is deemed to be popular and is moved to the cache 226 via the mover pool 222.

FIG. 5, with reference to FIG. 1 and FIG. 2, illustrates the predictor list 221 cleaning process for the VOD system 100. The cleaning process 500 shown in FIG. 5 begins when the VOD system 100 receives a predictor list 221 clean request (step 502). In one embodiment, the predictor list 221 clean request is generated as a periodic, timed process. The VOD system 100 examines the age of the content in the tail of the predictor list 221 (e.g., by computing the difference between the current time and the last buy time) to determine whether it exceeds the current window length (step 504). If the age of the content in the tail of the predictor list 221 exceeds the current window length (step 504, Y branch), the VOD system 100 sets the buy count for the content in the tail of the predictor list 221 to zero (step 506), and removes the content from the predictor list 221 (step 508). If the age of the content in the tail of the predictor list 221 does not exceed the current window length (step 504, N branch), the cleaning process 500 stops.

FIG. 6, with reference to FIG. 1 and FIG. 2, illustrates the cache 226 clear timer process for the VOD system 100. The clear timer process 600 shown in FIG. 6 begins when the VOD system 100 receives a cache 226 clear timer request (step 602). In one embodiment, the cache 226 clear timer request is generated as a periodic, timed process. In another embodiment, the cache 226 clear timer request is triggered by a promotion request. The VOD system 100 sets the window length for the predictor list 221 by determining the age of the content in the tail of the cache 226, and calculating that age divided by the divider (step 604). The VOD system 100 then examines the size of the cache 226 to determine whether it exceeds the size limit (step 606). If the size of the cache 226 exceeds the size limit (step 606, Y branch), the VOD system 100 removes the content from the tail of the cache 226 (step 608), and adjusts the used cache 226 size (step 610). If the size of the cache 226 does not exceed the size limit (step 606, N branch), the clear timer process 600 stops.

Although the disclosed embodiments describe a fully functioning method for hierarchical caching of content in an on-demand computing device, the reader should understand that other equivalent embodiments exist. Since numerous modifications and variations will occur to those reviewing this disclosure, the method for hierarchical caching of content in an on-demand computing device is not limited to the exact construction and operation illustrated and disclosed. Accordingly, this disclosure intends all suitable modifications and equivalents to fall within the scope of the claims.

We claim:

1. A method, comprising:

receiving over a network, at an on-demand computing device, a request to send media content to a playback device, wherein the media content is stored in a media library of a content server;

recording a buy time for the media content requested;

comparing the media content requested to a predictor list, wherein the predictor list includes content names that are candidates for promotion to a cache if a buy count for the media content requested reaches a threshold;

retrieving the media content from a hierarchical cache, the hierarchical cache including the predictor list, a cache and the content library, wherein the window length of time during which the buy count may result in promotion to the cache is adjusted based on an age of the content with the oldest buy time in the cache; and sending the media content over a network to the playback device.

2. The method of claim 1, wherein the retrieving of the media content further comprises:

determining that the cache includes the media content; and retrieving the media content from the cache.

3. The method of claim 2, further comprising:

moving the media content in the cache to a head of the cache; and updating the buy time associated with the media content in the cache, wherein the cache is a least recently used cache.

4. The method of claim 1, wherein the retrieving of the media content further comprises:

determining that the cache does not include the media content;

sending a request to retrieve the media content from the media library of the content server; and receiving the media content from the content server.

5. The method of claim 4, further comprising:

when the predictor list includes a list of the media content:

updating a buy count associated with the media content in the predictor list;

computing a popularity value associated with the media content in the predictor list; and when the popularity value exceeds a promote threshold:

moving the media content in the predictor list first to a mover pool; and promoting the media content in the mover pool to the cache.

6. The method of claim 4, further comprising:

when the predictor list does not include the media content: adding the media content to the predictor list.

7. The method of claim 1, further comprising:

adjusting the buy count for the media content to reflect a percentage of the media content sent to the playback device.

8. The method of claim 1, further comprising:

computing the window length of time during which the buy count may result in promotion to the cache;

computing an age for a tail of the predictor list; and when the age for the tail of the predictor list exceeds the window length:

setting a buy count for the tail of the predictor list to zero; and removing the tail of the predictor list.

9. The method of claim 8, wherein computing the window length further comprises:

computing an age for the tail of the cache; and dividing the age for the tail of the cache by a divider.

10. The method of claim 1, further comprising:

when a size of the cache exceeds a size limit:

removing a tail of the cache; and adjusting a used cache size for the cache, wherein the cache is a least recently used cache.

11. An on-demand computing system, comprising:

a memory device resident in the on-demand computing system; and a processor disposed in communication with the memory device, the processor configured to:

receive over a network a request to send media content to a playback device, wherein the media content is stored in a media library of a content server;

record a buy time for the media content requested;

compare the media content requested to a predictor list, wherein the predictor list includes content names that are candidates for promotion to a cache if a buy count for the media content requested reaches a threshold;

retrieve the media content from a hierarchical cache, the hierarchical cache including the predictor list, a cache and the content library, wherein the window length of time during which the buy count may result in promotion to the cache is adjusted based on an age of the content with the oldest buy time in the cache; and sending the media content over a network to the playback device.

12. The on-demand computing system of claim 11, wherein to retrieve the media content, the processor is further configured to:

determine that the cache includes the media content; and retrieve the media content from the cache.

13. The on-demand computing system of claim 12, wherein the processor is further configured to:

move the media content in the cache to a head of the cache; and update the buy time associated with the media content in the cache, wherein the cache is a least recently used cache.

14. The on-demand computing system of claim 11, wherein to retrieve the media content, the processor is further configured to:

determine that the cache does not include the media content;

send a request to retrieve the media content from the media library of the content server; and receive the media content from the content server.

15. The on-demand computing system of claim 14, wherein the processor is further configured to:

when the predictor list includes a list of the media content:

update a buy count associated with the media content in the predictor list;

compute a popularity value associated with the media content in the predictor list; and when the popularity value exceeds a promote threshold:

move the media content in the predictor list first to a mover pool; and promote the media content in the mover pool to the cache.

16. The on-demand computing system of claim 14, wherein the processor is further configured to:

when the predictor list does not include the media content:

add the media content to the predictor list.

17. The on-demand computing system of claim 11, wherein the processor is further configured to:

adjust the buy count for the media content to reflect a percentage of the media content sent to the playback device.

18. The on-demand computing system of claim 11, wherein the processor is further configured to:

compute the window length of time during which the buy count may result in promotion to the cache;

compute an age for a tail of the predictor list; and when the age for the tail of the predictor list exceeds the window length:

set a buy count for the tail of the predictor list to zero; and remove the tail of the predictor list.

19. The on-demand computing system of claim 18, wherein to compute the window length, the processor is further configured to:

compute an age for the tail of the cache; and divide the age for the tail of the cache by a divider.

20. The on-demand computing system of claim 11, wherein the processor is further configured to:

when a size of the cache exceeds a size limit:

remove a tail of the cache; and adjust a used cache size for the cache, wherein the cache is a least recently used cache.

21. A non-transitory computer-readable medium, comprising computer-executable instructions that, when executed on a computing device, perform the method of claim 1.

* * * * *